United States Patent Office 3,244,532
Patented Apr. 5, 1966

3,244,532
METHOD FOR STEAM DISTILLATION OF COFFEE AROMAS
James P. Mahlmann, Wayne, N.J., assignor to General Foods Corporation, White Plains, N.Y., a corporation of Delaware
No Drawing. Filed Sept. 20, 1965, Ser. No. 488,753
4 Claims. (Cl. 99—71)

The present invention is a continuation-in-part of Serial No. 244,011 filed December 12, 1962 now abandoned which was a continuation-in-part of Serial No. 67,922, filed November 8, 1960 (now abandoned).

The present invention relates to a new and improved process for steam distilling volatile aromas from coffee while minimizing degradation of the coffee solids being treated.

In the production of soluble coffee products from roasted coffee it has long been felt that many of the steam volatile flavor and aroma constituents contained therein would be useful in the aromatization and flavor enhancement of the aqueous extract of roasted and ground coffee. Processes have thus been proposed for the introduction of steam to a bed of roasted coffee, preferably one which has been ground, in order to wet the coffee particles and extract therefrom the volatile constituents which would otherwise be lost in the course of soluble coffee production either in the percolating columns or in the course of concentrating the aqueous extract of roasted coffee. Unfortunately, when a bed of roasted and ground coffee is contacted with steam the operation involves a rather prolonged period of time, in the order of 20 minutes or more, during which the steam condenses on the coffee particles and is retained thereby. As a consequence of this prolonged contact and moisture retention, the flavor of the water soluble coffee solids tends to degrade, thus giving an inferior soluble coffee. The closed chamber has vapor locks to prevent loss of pressure in the system.

It is an object of the present invention to prepare an improved steam volatile flavor having all of the desirable attributes of prior art steam volatile flavors, but being in a form substantially less degraded than such prior art flavors.

It is a further object of the present invention to prepare a steam volatile flavor in substantially less time than is required by prior art methods.

It has now been discovered that the objects of the present invention may be met by contacting all the particles in a moving, agitated bed of coffee having a length at least ten times its width with saturated steam at a pressure of 2 to 20 p.s.i.g. for a period of between 0.5 to 10 minutes to release between 1 to 5% by weight of the coffee in the form of vapors, said vapors including aromatics, acids and water, collecting said vapors, and then concentrating the volatile aromas in said vapors to remove acids and water and obtain a yield of between 0.1 to 2% of aromatics by weight of the original coffee.

The present invention comprises moving and agitating a bed of roasted and ground coffee by any suitable means such as a screw conveyor in a continuous or semi-continuous fashion whereby the bed of roasted coffee material is caused to travel in one direction while steam is introduced either counter-current or co-current to the travel of the agitated bed of roasted coffee. In this way more intimate contact between the roasted coffee particles and the steam is achieved with a minimum of dwell time, thus, the opportunity for degradation of the flavor values of the unextracted, less volatile, water-soluble solids is avoided. The flights on the screw serve to move the coffee through the closed chamber while the steam, introduced with a slight pressure head, serves to move the vapors through the closed chamber in the direction of the steam. The closed chamber has vapor locks to prevent loss of pressure in the system. Extraction of aromas is accomplished at a pressure slightly above atmospheric and a temperature of between 180° and 230° F., preferably about 212° F.

In a preferred embodiment of the present invention the steaming chamber includes a rotating screw or auger with closed flights and a surrounding barrel having vapor tight rotary valves at each end of the barrel. Roasted and ground coffee is introduced at one end and steam is introduced at the other end. In the course of travel the coffee particles are agitated and each particle of coffee is individually contacted by the steam. In the initial steps of the operation the steam wets the coffee particle and becomes absorbed therein. As the agitation continues, the steam serves to extract aromatic material, as well as some acids and water, in the form of vapors, from the roasted and ground coffee. These vapors are collected and then concentrated in a fractionator column which removes acids and water and obtains a yield of aromatics in the range of 0.1 to 2%, preferably 0.5 to 1%, by weight of the coffee treated. The acids are removed at the bottom of the fractionator column along with most of the water. The aromatics are collected by condensation of the volatile vapors at a temperature of 180° F. or less, preferably 35° to 70° F. The fractionator column provides a reflux and rectification of the vapors removed by the short-time steaming operation and thus produces a similar aroma to that obtained in Patent No. 3,132,947 by steaming a static bed of coffee for 20 to 30 minutes wherein a reflux and rectification operation is achieved inside the bed.

Although desirable flavor and aroma values can be extracted by the use of steam circulating co-current to the travel of roasted and ground coffee, it is preferred by the process of the present invention that the steam travel in a direction counter-current to the travel of the bed of ground coffee particles. In this manner, the more aromatic coffee (the coffee most capable of degradation) is contacted by the mildest temperature in the steaming operation and the least aromatic coffee is contacted by the highest or most drastic temperature.

Steam is introduced at a mild pressure of about 2 to 20 p.s.i.g., thus providing a temperature of between 220° to 250° F. at the entrance of the steam to the coffee charge. However, this will quickly be lowered to between 180° and 230° F. as the steam begins its travel through the coffee. The amount or rate of steam required may vary over a wide range depending on the charge of coffee being treated, the particle size of the coffee, the moisture content of the coffee and the physical measurements of the apparatus. However, these variables should all be adjusted to provide an initial vapor yield of between 1 to 5% which must then be concentrated by fractionation or other means to an aromatic yield of between 0.1 to 2%, preferably 0.5 to 1%, by weight of the original coffee charge.

It is important in this aroma removal treatment to release the aromas from the coffee in as short a time as possible. If good contact of all the particles with the steam is achieved 30 seconds will suffice to obtain an initial vapor yield of above 1% which can then be further concentrated to about 0.1% after the acids and water have been removed. Where contact of the coffee particles with the steam is not good, or whole beans are used, longer times are required of about 2 to 5 minutes and perhaps even 10 minutes to extract initial condenser yields of between 1 to 5% aromatics, water and acids. However, the essential requirements of this process are the low temperature aroma removal at 212° to 230° F., short contact time of the coffee with the steam at this temperature, and the use of low pressure to thus attain a substantially amospheric steaming of the coffee. The use of excessive pressures, above 20 p.s.i.g. develops steam temperatures which degrade the aroma being collected and also the residual aroma in the coffee solids being steamed.

The invention will now be more fully described by reference to the following example:

Six hundred pounds per hour of ground, roasted coffee (90% on 40 mesh U.S. Standard Sieve) were fed into one end of a steaming screw having vapor locks at both ends. The rotating screw was 3" in diameter and 6' in length, had closed flights, and was of such a design and speed that all flights were full of coffee. A steam-coffee contact time of less than 60 seconds was maintained. Steam was introduced counter-currently at the opposite end. The steam was fed at 10 p.s.i.g. and 450 pounds per hour and followed a helical path defined by the rotating screw in order to assure the most efficient removal of all aromatics. The aromatic vapors were taken off at a 5% yield at the same point the coffee was fed into the screw and directed toward a fractionater column 6" in diameter and 8' in length. The column was packed with ½" glass rings. The crude vapors passed through the fractionater and then were condensed at 60° F. to give a 0.5 yield of aromatics. Water and acids were removed from the bottom of the fractionater column.

The preceding example illustrates one embodiment of the present invention, but it is to be understood that this example is for purposes of illustration only and that the invention is not to be limited thereto since various changes can be made without departing from its scope and spirit, reference being had to the appended claims for a definition of the invention.

What is claimed is:

1. A process for improving steam distillation of volatile aromas from coffee while minimizing degradation of the coffee solids being treated which comprises contacting all the particles in a moving, agitated bed of coffee having a length at least ten times its width with saturated steam at a pressure of 2 to 20 p.s.i.g. for a period of between 0.5 to 10 minutes to release between 1 to 5% by weight of the coffee in the form of vapors, said vapors including aromatics, acids and water, collecting said vapors, concentrating the volatile aromas in said vapors to remove acids and water and obtain a yield of between 0.1 to 2% of aromatics by weight of the original coffee, extracting soluble solids from the steamed coffee, and combining said concentrated volatile aromas with said soluble coffee solids.

2. The process of claim 1 wherein the flow of steam is counter-current to the flow of coffee and the aromas are vaporized at a temperature of between 180° and 230° F.

3. The process of claim 2 wherein the said concentrated volatile aromas are combined with the soluble coffee solids prior to drying.

4. A process for improving steam distillation of volatile aromas from coffee while minimizing degradation of the coffee solids being treated which comprises contacting all the particles in a moving, agitated bed of coffee having a length at least ten times its width with saturated steam introduced counter-current to said coffee at a pressure of 2 to 20 p.s.i.g. and a temperature of 180° to 230° F. for a period of between 0.5 to 10 minutes to release between 1 to 5% by weight of the coffee in the form of vapors, said vapors including aromatics, acids and water, collecting said vapors, concentrating the volatile aromas in said vapors to remove acids and water and obtain a yield of between 0.1 to 2% of aromatics by weight of the original coffee, extracting soluble solids from the steamed coffee, and combining said concentrated volatile aromas with said soluble coffee solids.

References Cited by the Examiner
UNITED STATES PATENTS

| | | | |
|---|---|---|---|
| 2,432,759 | 12/1947 | Heyman | 99—71 |
| 2,513,813 | 7/1950 | Milleville | 99—71 X |
| 2,562,563 | 7/1951 | McBean | 99—289 |
| 2,587,556 | 2/1952 | Weiss et al. | 99—289 |
| 2,847,368 | 8/1958 | Worthington et al. | 202—46 |
| 3,132,947 | 5/1964 | Mablmana | 99—71 |

A. LOUIS MONACELL, *Primary Examiner.*

M. W. GREENSTEIN, *Assistant Examiner.*